United States Patent [19]

Maltby et al.

[11] 4,208,909

[45] Jun. 24, 1980

[54] ADMITTANCE SENSING PROBE HAVING MULTIPLE SENSING ELEMENTS

[75] Inventors: Frederick L. Maltby, Jenkintown; L. Jonathan Kramer, Warminster, both of Pa.

[73] Assignee: Drexelbrook Controls, Inc., Horsham, Pa.

[21] Appl. No.: 963,300

[22] Filed: Nov. 24, 1978

[51] Int. Cl.² ............................................. G01F 23/26
[52] U.S. Cl. ................................... 73/304 C; 361/284
[58] Field of Search ......................... 73/304 C, 304 R; 361/284

[56] References Cited

U.S. PATENT DOCUMENTS

| | | | |
|---|---|---|---|
| 2,622,442 | 12/1952 | De Boisblanc et al. | 73/304 C |
| 2,950,426 | 8/1960 | Frome | 73/304 C |
| 3,079,797 | 3/1963 | Hermanson | 73/304 C |
| 4,010,650 | 3/1977 | Piatkowski | 73/304 C |
| 4,021,707 | 5/1977 | Ehret et al. | 361/284 |

Primary Examiner—Donald O. Woodiel
Attorney, Agent, or Firm—Woodcock, Washburn, Kurtz, Mackiewicz & Norris

[57] ABSTRACT

A single, elongated admittance sensing probe element comprises an elongated probe structure including a conductive level measuring probe electrode and a conductive composition probe electrode longitudinally spaced from the level measuring probe electrode closer to one end of the probe. A conductive shield extends between the level measuring and composition probe elements and beyond the composition probe element at the end of the probe. The entire structure is enclosed within an insulating material. In one embodiment, a cylindrical ground electrode or shield is mounted around the probe structure.

26 Claims, 5 Drawing Figures

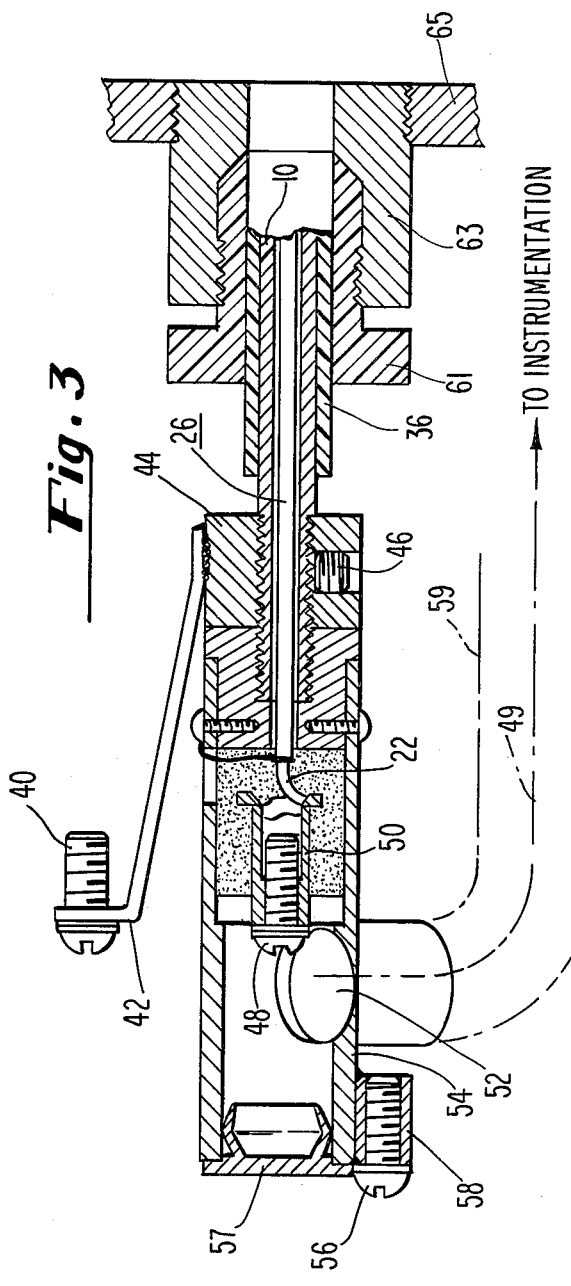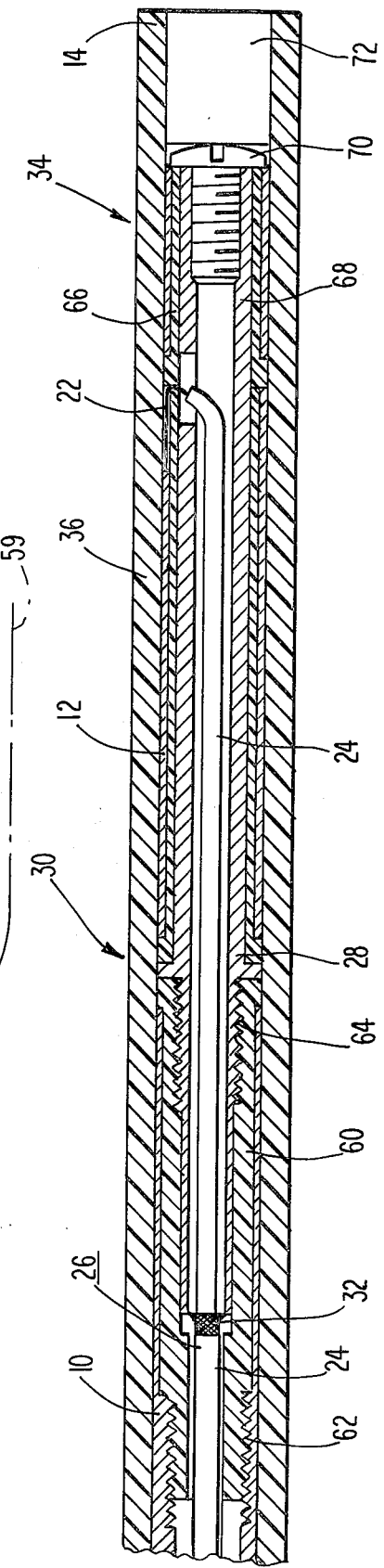

ADMITTANCE SENSING PROBE HAVING MULTIPLE SENSING ELEMENTS

BACKGROUND OF THE INVENTION

This invention relates to admittance sensing probes, sometimes referred to as RF probes, which are utilized to determine the condition and/or the level of materials.

Heretofore, it has been suggested that admittance and/or RF sensing probes be provided with a capacity to measure the nature of the composition as well as the level of materials so as to permit the level reading to be appropriately compensated for changes in the dielectric constant of the material whose level is being measured. Such probes are disclosed in U.S. Pat. Nos. 2,622,442—De Boisblanc et al and 3,230,770—Hermanson. As shown in the De Boisblanc et al patent, an elongated probe comprises a level measuring conductive probe electrode as well as reference or composition measuring conductive probe electrodes which are longitudinally spaced from the level probe electrodes so as to be closer to one end of the probe structure. The composition probe electrode provides the important function of compensating for variations in the dielectric constant of the materials within the vessel in which the probe has been inserted so as to permit the level measuring probe element to accurately measure the level of materials despite variations in the dielectric constant of the materials within the vessel.

While the use of the composition probe electrode does compensate for variations in the dielectric constant and does therefore improve the accuracy of the probe, the use of the composition probe electrode can produce fringing and leakage which will distort the level measurement. For example, the De Boisblanc et al patent discloses conductors leading away from the level measuring probe electrode which extends into close proximity to the level measuring probe electrodes and could produce an undesired capacitance which could distort the level and/or the composition measurement which would in turn distort the compensated level measurement. Moreover, fringing between the composition probe electrodes and the level measuring probe electrodes could occur with a similar effect. In addition to the fringing effects between the level measuring probe electrodes and the composition measuring probe electrodes, serious fringing effects can occur between the composition measuring probe electrodes and the vessel. Since it is desirable to locate the composition probe element in close proximity to the bottom of the vessel to assure that the composition probe element is always submerged, the composition probe element is necessarily located at the end of the probe structure and therefore subject to fringing with respect to the bottom of the vessel. This of course can affect the ability of the composition probe element to accurately compensate for changes in the dielectric constant of the material within the vessel.

SUMMARY OF THE INVENTION

It is an overall object of this invention to provide an admittance measuring probe apparatus so as to accurately measure the condition of materials in a vessel including compensated level regardless of changes in the composition, density or dielectric constant of the materials.

It is a further object of this invention to provide such a probe apparatus which is capable of single entry into a vessel so as to facilitate its use under a variety of conditions including the retrofitting of existing vessels.

It is yet another overall object of this invention to provide such a probe apparatus which is capable of measuring conditions close to the bottom of a vessel.

It is also an object of this invention to provide such a probe apparatus which may be easily cleaned.

It is a further object of this invention to provide such a probe apparatus which is unaffected by the probes close proximity to an agitator or other conditions at the bottom of a vessel.

It is also an object of this invention to provide a probe apparatus which is simple, rugged, reliable and inexpensive.

It is another object of this invention to provide a probe apparatus which is usable with insulating or conductive materials.

It is yet another object of this invention to provide a probe apparatus which is unaffected by variations in pressure.

It is yet another object of this invention to provide a probe apparatus which allows electronic circuitry to be remotely located with respect to the probe.

It is a still further specific object of this invention to provide such a probe apparatus which may be easily precalibrated.

It is a further object of this invention to provide a probe which is capable of the foregoing while also ignoring the effects of coatings.

It is a still further object of this invention to provide a probe apparatus which is capable of the foregoing while also compensating for changes in the dielectric constant of the probe insulation.

In accordance with these and other objects of the invention, an admittance sensing probe which is adapted to sense the level of materials comprises a level or condition measuring probe electrode comprising a conductive material and a composition measuring or compensation probe electrode comprising a conductive material. A shield means comprising a conductive material is interposed between a conductor leading from one of the electrodes and the other of the electrodes. The shield is also interposed between the conductor and the materials within the vessel.

In accordance with one important aspect of the invention, the conductive shield means is also interposed between the probe elements. In accordance with still another important aspect of the invention, the conductive shield means may extend beyond the composition probe electrode located at one end of the probe.

In the preferred embodiment of the invention, the probe is elongated and the composition probe electrode and the level measuring probe electrode are mutually longitudinally spaced along the probe with the overall longitudinal length of the composition probe electrode being less than the level electrode so as to assure that the composition electrode is fully and always submerged. The conductive shield means and the conductor extend longitudinally along the probe. Preferably, the composition probe electrode as well as the level measuring probe electrode are substantially cylindrical. The conductor extends through the level measuring probe electrode in a direction generally parallel with the axis of the probe and the shield means also extends through the level measuring probe electrode in a direction generally parallel with the axis of the probe so as to be interposed between the conductor and the cylindrical probe electrode. Insulating means covers the entire probe including the level measuring electrode, the composition electrode and the portion of the shield which extends beyond the composition probe electrode and the portion of the shield which extends radially outwardly between the level measuring probe electrode and the composition probe electrode. In a preferred embodiment of the invention, a coaxial cable is provided with the inner conductor serving as the conductor leading to the composition probe electrode and the outer conductor forming a portion of the shield.

In accordance with another important aspect of the invention, a cylindrical electrode surrounds or encircles the probe structure so as to permit precalibration of the structure. Such an additional electrode may be utilized with the probe when the materials within the vessel are of sufficiently low viscosity so as to flow freely up and down the probe between the surrounding electrode and the insulation covering the level measuring and the composition measuring probe electrodes.

The probe of the preferred embodiment of the invention may be utilized in conjunction with circuit means for combining the admittance measurement of the level measuring electrode with the admittance measurement of the composition probe electrode for determining the level of materials within the vessel. The circuitry also provides means for driving the shield at substantially the same potential as the level measuring probe electrode and the composition measuring probe electrode.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 3 is a detailed sectional view of one end of the probe shown in FIG. 1;

FIG. 4 is a detailed sectional view of the other end of the probe shown in FIG. 1.

DETAILED DESCRIPTION OF A PREFERRED EMBODIMENT

Figure 1:
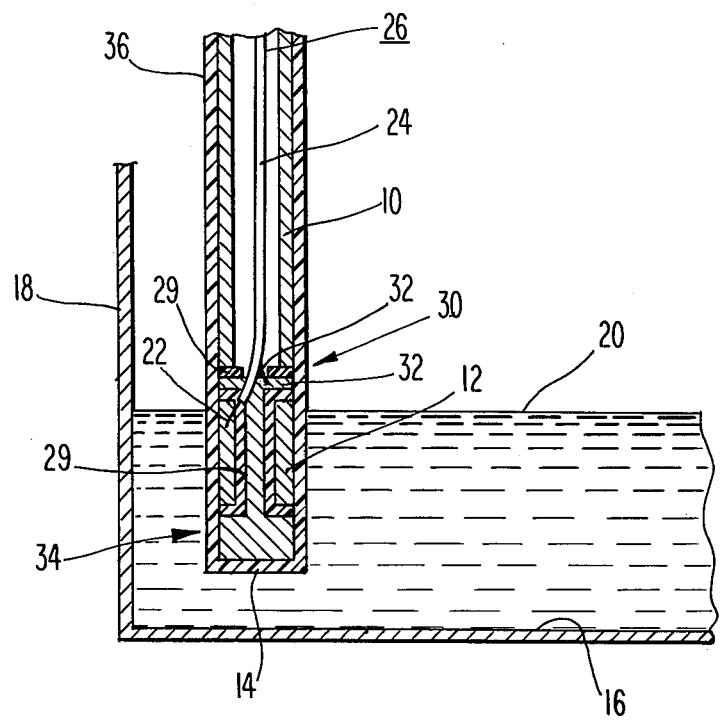
FIG. 1 is a simplified sectional view of a probe constructed in accordance with the principles of this invention.

As shown in FIG. 1, a single elongated probe structure or element permitting single vessel entry comprises a level or condition measuring electrode 10 and a composition measuring or compensating electrode 12 which is longitudinally spaced from the level electrode 10 so as to be closer to the end 14 of the probe which is positioned adjacent a bottom 16 of a vessel 18. The level measuring probe 10 is adapted to measure the level of the materials as the level 20 varies within the vessel 18 while the composition electrode 12 which is short relative to the electrode 10 is always submerged below the level 20 and compensates for changes in the composition, density or dielectric constant of the materials within the vessel 18 as well as insulating material 36. The composition electrode 12 which comprises a conductive material as does the level measuring electrode 10 is connected to circuitry not shown by means of a conductor, i.e., lead or wire, 22 which extends away from the end of the probe 14 generally along the axis of the probe.

In accordance with this invention, the conductor 22 is shielded from the level measuring electrode 10 by means of a conductive shield means comprising the outer conductor 24 of a coaxial cable 26 where the inner conductor comprises the conductor 22. It will therefore be understood that the outer conductor or shield 24 is interposed between the inner conductor 22 and the level measuring electrode 10 while at the same time being interposed between the conductor 22 and the materials within the vessel 18. As a consequence, the effects of stray capacitance or admittance between the conductor 22 and the materials within the vessel or the level measuring electrode 10 are substantially eliminated.

In accordance with another important aspect of the invention, the shielding of the probe further comprises a conductive member 28 which extends outwardly from a connection 32 with the conductor 24 in the area 30 so as to be interposed between the level measuring electrode 10 and the compensating electrode 12. The length of the member 28 as measured along the longitudinal axis of the probe 28 is quite short and is adequate to prevent fringing between the electrodes 10 and 12. The shield further extends axially along the probe toward the end 14 where it extends outwardly in the area 34 so as to prevent fringing effects between the composition electrode 12 and the bottom of the vessel 16. In this regard, it will be noted that the length of the guard 28 which extends beyond the extremity of the electrode 12 is quite substantial to avoid fringing affects with the bottom 16 of the vessel which is maintained at ground and is in close proximity with the tip of the probe. It will therefore be appreciated that the very small electrode 12 is well shielded.

Insulation 29 separates the conductor 28 from the electrodes 10 and 12. The entire probe structure is covered with the insulating material 36 from the end 14 upwardly past the compensating electrode 12 and the level measuring electrode 10.

Figure 2:
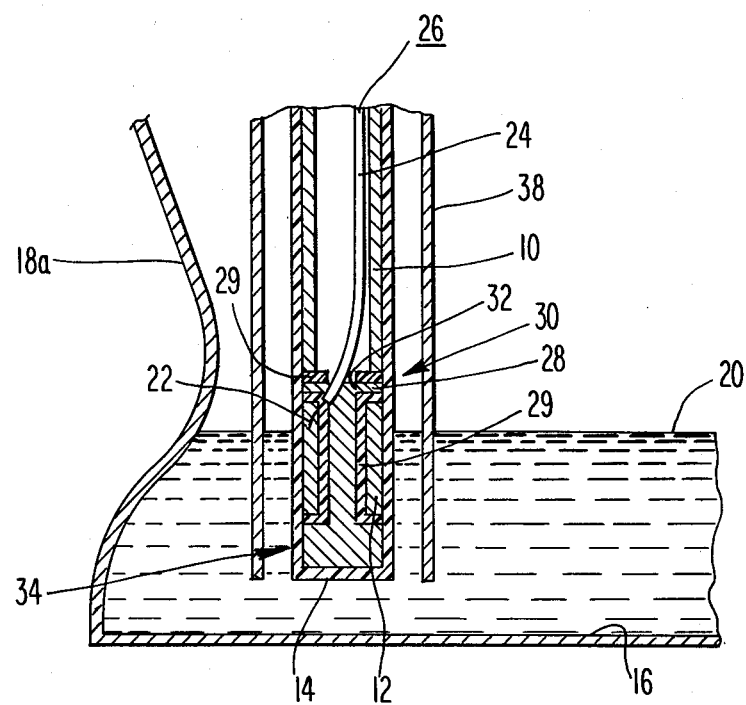
FIG. 2 is the probe of FIG. 1 in combination with a concentric shield element for facilitating accurate readings and precalibration.

In accordance with another important aspect of the invention, the entire probe structure may be enclosed within a cylindrical, grounded shield electrode 38 which is spaced outwardly from the insulating material 36 as shown in FIG. 2. Such a ground electrode 38 assures a constant distance between the electrodes 10 and 12 and ground so as to remove the ambiguity which might arise when the distance to the wall of the vessel 18a is unknown or varies as shown in FIG. 2. Such an electrode 38 may be utilized whenever the liquid is relatively non-viscous, e.g., not a slurry, so as to permit the liquid to move upwardly in the space between the probe and the shield 38 in accordance with the actual level 20 of the materials within the vessel 18. This allows the probe to be precalibrated since the distance to the wall of the vessel 18 becomes irrelevant. It will be understood that such an electrode 38 may not be utilized where the material whose level is being measured is quite viscous.

Reference will now be made to FIGS. 3 and 4 for a more detailed description of the structure of the probe shown in FIG. 1 where the reference characters utilized in FIG. 1 are also utilized in FIGS. 3 and 4 to depict the same elements. As shown in FIG. 3, connection to the level measuring electrode 10 is made through a screw 40 which is inserted through a bracket 42 attached to a conductive collar 44 which threadedly engages the extremity of the level measuring electrode 10. A set screw 46 in the collar 44 is provided to hold the collar 44 in place on the level measuring electrode 10. Connection to the composition probe electrode 12 is made at a screw 48 which threadedly engages a conductive jacket 50 attached to the inner conductor 22 of the coaxial cable 26. A lead 49 shown in broken lines which may be connected to the screw 48 passes through an opening 52 in the wall of the probe which forms another portion 54 of the shield. The connection to the shield 54 is made through a screw 56 which is attached to a bracket 58 at the very end of the probe adjacent a plug 57. It will be appreciated that a shield 59 around the lead 49 may be extended to suitable instrumentation such as that described in FIG. 5.

As also shown in FIG. 3, the probe is easily mounted by use of a compression plug 61 which threadedly engages a fitting 63. The fitting 63 in turn is threadedly engaged by a flange 65 associated with the wall of the vessel. Note that the probe is effectively held where the metal of the electrode 10 provides support so as to achieve a rugged design.

The detailed structure at the electrode end of the probe shown in FIG. 1 will now be described with reference to FIG. 4. Although not shown in FIG. 1 for purposes of simplification of that drawing, the probe includes an insulating material 60 located between the level measuring electrode 10 and threadedly secured thereto at an end 62. The insulation 60 is also threadedly secured to a portion 64 of the shield 28.

As also shown in FIG. 4, the shield 28 extends up through the insulation 60 inside the level measuring electrode 10 for a distance to a point where the connection 32 is made with the outer conductor 24 of the coaxial cable 26.

As further shown in FIG. 4, the terminal portion in the area 34 of the shield 28 is not solid as shown in FIG. 1 but rather hollow so as to contain cylindrical insulation 66 and an interior cylindrical shield portion 68 which is threadedly engaged by a screw 70. An insulated plug 72 is inserted in the end of the probe 14 within the cylindrical insulating jacket or cover 36.

It will be understood that the composition probe electrode 12 is of substantially lesser length than the level measuring probe 10. This permits measurements within the vessel 18 which are relatively close to the bottom since the composition electrode 12, because of its relatively short length, will always be submerged or below the level 20 of the liquid within the vessel 18.

Figure 5:
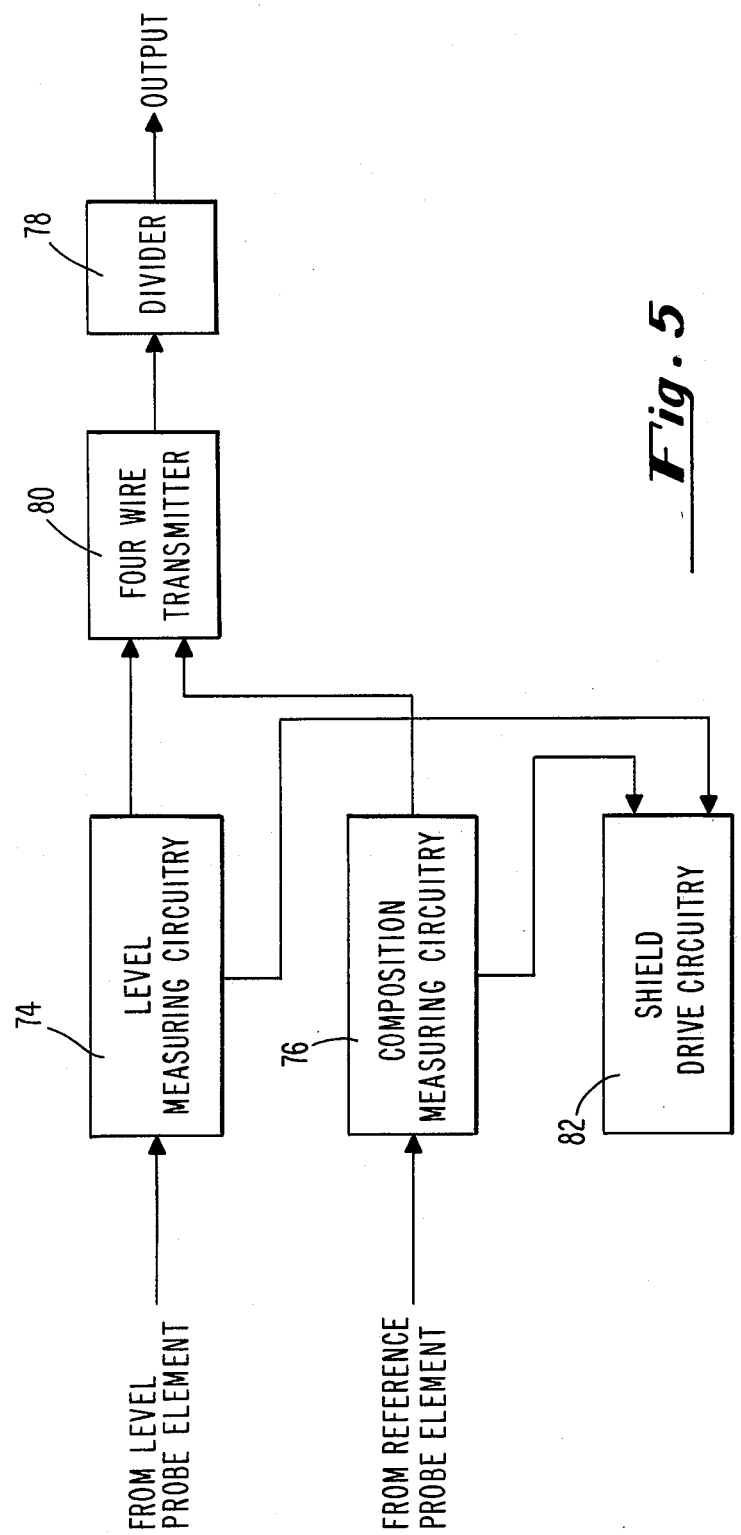
FIG. 5 is a block diagram of circuitry utilized in conjunction with the probes shown in FIGS. 1–4.

Reference will now be made to FIG. 5 for a brief discussion of the circuitry which is utilized in conjunction with the probe or probes shown in FIGS. 1-4. The circuitry includes level measuring circuitry 74 which is connected to the level measuring probe element or electrode 10 and composition measuring circuitry 76 which is connected to the composition probe element or electrode 12. The output from the level measuring circuitry 74 and the composition measuring circuitry 76 may be combined at a divider circuit 78 so as to generate an output signal which represents the compensated or actual level 20 of the liquid within the vessel 18 appropriately compensated or corrected for variations in the dielectric constant of the liquid. In the preferred embodiment of the invention, the level measuring circuitry 74 and the composition measuring circuitry 76 are connected to the divider 78 via a four-wire transmitter 80 of the type disclosed in copending application Ser. No. 963,299 filed Nov. 24, 1978 which is incorporated herein by reference as if set forth in full. As also shown in FIG. 5, the level measuring circuitry 74 and the composition measuring circuitry 76 generate an input to the shield drive circuitry 82 so as to allow the shield 28 to be driven at substantially the same potential as the level measuring electrode and the composition electrode 12.

In accordance with an important aspect of this invention, the insulation 36 may comprise a variety of materials regardless of the stability of the dielectric constant since the composition electrode 12 and the level measuring electrode 10 are substantially equally affected. One particularly desirable insulation material is a high molecular weight polymer of vinylidene fluoride having a dielectric constant in excess of 4 such as that sold under the name Kynar. Such insulation may be pressure bonded to the probe to eliminate air spaces and thereby make the probe independent of pressure changes. It will of course be appreciated that the probe may eliminate the insulation 36 altogether if the condition of nonconductive materials is to be measured.

It will also be appreciated that although a single composition or compensating electrode has been shown, a plurality of such electrodes may be utilized.

The phrase "level or condition measuring" electrode has been utilized herein to denote an electrode capable of measuring the level of material uncorrected or uncompensated for changes, for example, in material such as density or dielectric constant as well as changes in the dielectric constant of the probe insulation. The phrase "composition measuring or compensating" electrode has been utilized herein to denote an electrode capable of measuring various changes, for example, in material density or dielectric constant as well as changes in the dielectric constant of the probe insulation.

In the embodiment shown, the shield means associated with and located between the electrodes 10 and 12 are maintained at the same potential. However, it will be understood that the shield means may be driven at different potentials.

Although a particular embodiment of the invention has been shown and described, it will be appreciated that various modifications may be made without departing from the true spirit and scope of the invention as set forth in the appended claims.

What is claimed is:

1. An admittance sensing probe adapted to sense the level of materials within a vessel comprising:

a condition measuring probe electrode comprising a conductive material;

a compensating probe electrode comprising a conductive material;

a conductor connected to one of said electrodes;

conductive shield means interposed between said conductor and said other of said electrodes, said conductive shield means also being interposed between said conductor and said materials within said vessel;

insulating means separating said condition measuring probe electrode, said compensating probe electrode, and said conductive shield means; and electrical connection means adapted to connect said shield means to circuitry for maintaining the potential of said conductive shield means substantially the same as said compensating probe electrode and said condition measuring probe electrode.

2. The admittance sensing probe of claim 1 wherein said conductive shield means is also interposed between said probe electrodes.

3. The admittance sensing probe of claim 2 wherein said conductive shield means extends beyond said one probe electrode in a direction away from said other probe electrode.

4. The admittance sensing probe of claim 1 wherein said probe is elongated and said composition probe electrode and said level measuring probe electrode are mutually longitudinally spaced along the probe.

5. The admittance sensing probe of claim 4 wherein said longitudinal length of said composition probe electrode is short relative to said measuring probe electrode.

6. The admittance sensing probe of claim 5 wherein said shield means and said conductor extend longitudinally along the probe.

7. The admittance sensing probe of claim 6 wherein said shield means is also physically interposed between said compensating probe electrode and said condition measuring probe electrode.

8. The admittance sensing probe of claim 7 wherein said shield means extends longitudinally beyond said compensating probe electrode.

9. The admittance sensing probe of claim 6 wherein said shield means is physically interposed between said compensating probe electrode and said condition measuring probe electrode and said shield means extends longitudinally beyond said compensating probe electrode.

10. The admittance sensing probe of claim 4 wherein:
said compensating probe electrode is substantially cylindrical;
said condition measuring probe electrode is substantially cylindrical;
said conductor extends through said condition measuring probe electrode and compensating probe electrode in a direction generally parallel with the axis of said condition measuring probe electrode; and
said shield means also extends through said condition measuring probe electrode generally parallel with the axis of said condition measuring probe electrode.

11. The admittance sensing probe of claim 1 including circuit means for combining the admittance measured at said condition measuring electrode with the admittance measured at said compensation probe electrode for detecting the level of material corrected for variations in the nature of the material.

12. The admittance sensing probe of claim 1 wherein said shield means is driven at substantially the same potential as said condition measuring probe electrode and said compensating probe electrode.

13. The admittance sensing probe of claim 1 wherein said conductive shield means extends beyond said one probe electrode in a direction away from said other probe electrode and also extends beyond said other probe electrode in an opposing direction away from said one probe electrode and said other probe electrode.

14. The admittance sensing probe of claim 13 wherein said probe is elongated and said compensation probe electrode is located nearer one end and said condition measuring probe electrode is located nearer another end.

15. The admittance sensing probe of claim 14 wherein said shield means extends beyond said condition measuring probe electrode in said opposing direction.

16. The admittance sensing probe of claim 15 further comprising a coaxial cable having an inner conductor and an outer conductor wherein said shield means includes the outer conductor of a coaxial cable and the inner conductor is connected to said compensating probe electrode.

17. The admittance sensing probe of claim 16 including additional shield means connected to said outer conductor at said one end of said probe.

18. An elongated admittance sensing probe adapted to sense the level of materials within a vessel comprising:
a condition measuring probe electrode comprising a conductive material nearer one end of said probe;
a compensating probe electrode comprising a conductive material nearer another end of said probe;
conductive shield means interposed between said condition measuring probe electrode and said compensating probe electrode;
insulating means mutually electrically insulating said condition measuring electrode, said compensating electrode and said shield means; and
electrical connection means adapted to connect said conductive shield means to circuitry for driving said conductive shield means at substantially the same potential as said condition measuring probe electrode and said compensating probe electrode.

19. The admittance sensing probe of claim 18 further comprising additional conductive shield means located adjacent one end of said probe and longitudinally displaced from said compensating probe electrode such that said compensating probe electrode is located between said additional shield means and said condition measuring probe electrode.

20. An elongated admittance sensing probe adapted to sense the level of materials within a vessel comprising:
a condition measuring probe electrode comprising a conductive material;
a compensating probe electrode comprising a conductive material longitudinally displaced from said condition measuring probe electrode;
conductive shield means located adjacent one end of said probe and longitudinally displaced from said compensating probe electrode such that said compensating probe electrode is located between said shield means and said condition measuring probe electrode; and
insulating means mutually separating said condition measuring probe electrode, said compensating probe electrode and said conductive shield means, said insulating means also separating said materials from said condition measuring said conductive shield means with substantially the same thickness thereof.

21. An admittance sensing probe adapted to sense the level of materials within a vessel comprising:
a condition measuring probe electrode comprising a conductive material;
a compensating probe electrode comprising a conductive material longitudinally displaced from said condition measuring probe electrode;
conductive shield means interposed between said condition measuring probe electrode and said compensating probe electrode; and insulating means mutually separating said condition measuring probe electrode, said compensating probe electrode in said conductive shield means, said insulating means also separating said materials from said condition measuring probe electrode, said compensating probe electrode and said conductive shield means with substantially the same thickness thereof.

22. An admittance sensing probe adapted to sense the level of materials within a vessel comprising:
 a condition measuring probe electrode comprising a conductive material;
 a compensating probe electrode comprising a conductive material;
 a conductor connected to one of said electrodes;
 conductive shield means interposed between said conductor and said other of said electrodes, said conductive shield means also being interposed between said conductor and said materials within said vessel; and
 insulating means tightly covering said compensating probe electrode and said condition measuring probe electrode.

23. The admittance sensing probe of claim 22 wherein said insulating means comprises a high molecular weight polymer of vinylidene fluoride having a dielectric constant in excess of 4.

24. The admittance sensing probe of claim 22 further comprising a coaxial cable including an inner conductor and an outer conductor, said conductor comprising the inner conductor of said cable and said shield means comprising the outer conductor of said cable.

25. The admittance sensing probe of claim 22 wherein said shield means extends radially outwardly to a position between said compensating probe electrode and said condition measuring probe electrode.

26. The admittance sensing probe of claim 22 wherein said shield means extends beyond said compensating probe electrode away from said condition measuring electrode.

* * * * *